H. F. FRICK.
DETACHABLE SEAMLESS DIAPHRAGM FOR GAS METERS.
APPLICATION FILED DEC. 13, 1909.
984,268.
Patented Feb. 14, 1911.
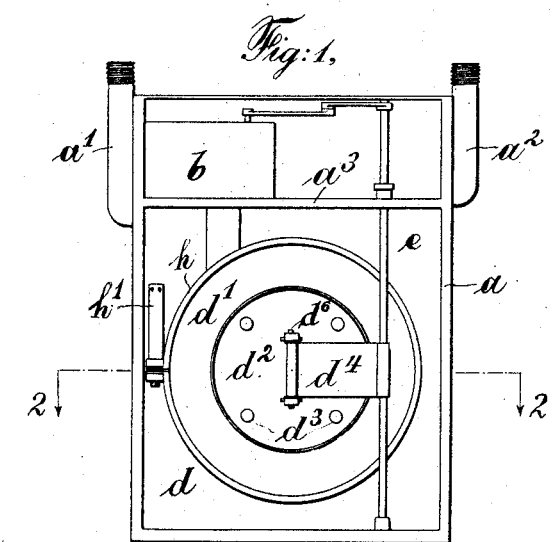
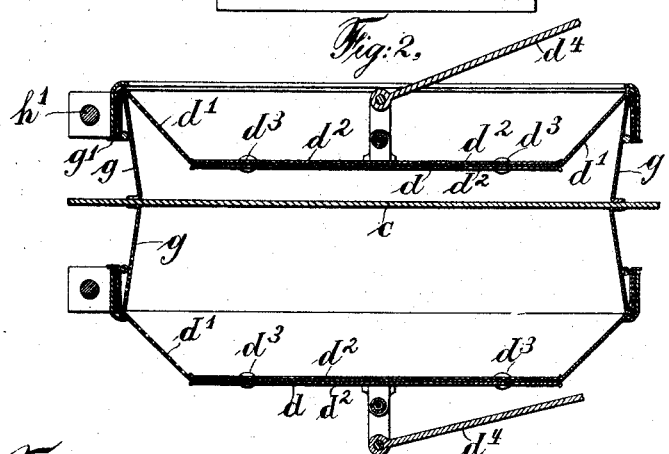
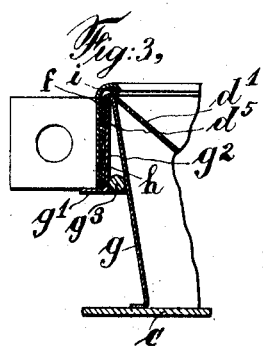
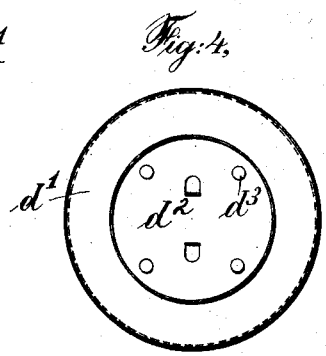
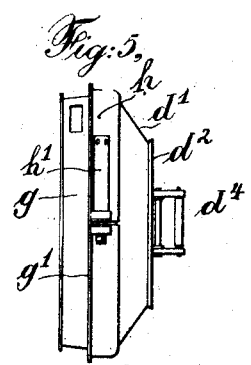
Witnesses:
M. Gaertner
James H. Goggin
Inventor
Herman F. Frick
By his Attorney
L. K. Böhm

UNITED STATES PATENT OFFICE.

HERMAN F. FRICK, OF JERSEY CITY, NEW JERSEY.

DETACHABLE SEAMLESS DIAPHRAGM FOR GAS-METERS.

984,268.  Specification of Letters Patent.  Patented Feb. 14, 1911.

Application filed December 13, 1909. Serial No. 532,960.

*To all whom it may concern:*

Be it known that I, HERMAN F. FRICK, a citizen of the United States, and a resident of Jersey City, county of Hudson, and State of New Jersey, have invented certain new and useful Improvements in Detachable Seamless Diaphragms for Gas-Meters, of which the following is a specification.

This invention has reference to improvements in diaphragms for gas meters and it is the special object of my invention to produce detachable and seamless diaphragms which may be readily mounted, taken out and exchanged in the meter.

The present invention relates to the diaphragms or bellows-like constructed devices in gas meters that occupy the greater part of the space in the meter below the valve mechanism which measure a certain quantity of gas at each operation. Each diaphragm is provided with an arm receiving from same motion and thereby driving the register and valve mechanism. Heretofore such diaphragms were usually constructed from a strip of leather sewed together on the overlapping portions in such manner that the stitch holes did not pass through the entire layer of the overlapping portion in order to prevent any escaping of gas through the stitch holes. This is rather painstaking and timetaking work and incurs a great deal of expense. These diaphragms were connected on both sides to suitable metal rings which had to be soldered into the meter and when an exchange or cleaning was necessary the solder had to be fused so that the diaphragm could be taken out and a new one inserted by soldering or the like. Hereby it occurred quite frequently that parts of the meter were damaged. The production of this diaphragm therefore was rather expensive and their insertion by soldering and the like increased the cost of running the meter.

The purpose of the present invention is to produce seamless diaphragms for gas meters which may be inserted and exchanged without the use of any solder. This is effected without disturbing or damaging any other parts of the meter and is done in considerably less time than with the former diaphragms. The construction of the novel diaphragms is such that they may be applied in any existing gas meter without changing it. In addition to these main objects it has been sought to reduce the cost of construction and incidentally the new diaphragms save money to the gas companies both in the first cost and in the cost of exchanging them. The novel diaphragms having no seams are not liable to derangement and leakage. Owing to their form they are more uniform and reliable in operation and care has been taken to produce a neat and desirable article, all as will be fully described hereinafter with reference to the accompanying drawing in which:

Figure 1 represents in front elevation a gas meter with the front wall removed embodying in desirable form the present improvements. Fig. 2 is a sectional view on an enlarged scale on line 2 2 of Fig. 1 with the casing omitted. Fig. 3 is an enlarged view of a detail of the device. Fig. 4 shows in plan view a slightly modified detachable diaphragm; and Fig. 5 is a side view of a detachable diaphragm and supporting ring.

Similar characters of reference denote like parts in all the figures.

In the drawing $a$ represents the gas meter, $a^1$ is the inlet and $a^2$ the outlet for the gas. In the upper portion of the meter there is a partition $a^3$ while $b$ represents the valve box. Centrally within the lower portion of the meter there is a second partition $c$ suitably supported and shown in section in Figs. 2 and 3. This partition $c$ supports the diaphragms or bellows-like constructed devices.

The novel diaphragm is constructed in substantially the following manner: Each diaphragm consists of a large circular leather disk $d$. The inner portion of this disk has on each side a thin small sheet metal disk $d^2$ slightly curved outwardly on its circumference so as to prevent a sharp edge on the leather as indicated in Fig. 2. The metal disks and the larger leather disk are united by small rivets $d^3$. The outer disk of sheet metal of each diaphragm has secured thereto a carriage $d^4$ with movable pin $d^6$ which preferably is also detachable. The carriage is in connection with a movable arm $e$ which receives motion from the diaphragms when in operation whereby the clock work is driven. At the outer margin the leather disk is curved forming an annular flange $d^5$ which may be strengthened by an annular strip of adhesive tape $f$.

The described device forms the detachable diaphragm. It is self-evident that the diaphragm composed of a continuous circular leather disk and provided centrally with an outer and inner disk of sheet metal does not require any seams while the marginal flange thereon renders it adapted to be applied within the meter leaving an operative continuous leather portion without seam between the disk and the flange. This portion $d^1$ is entirely smooth and can not form gathers during operation because its marginal end portion is secured as is the case with former devices.

Two diaphragms are secured in each meter to the partition $c$ one on each side. While in former devices the diaphragm with its two metal rings had to be soldered into the meter this is not necessary by the use of the present invention. A metal ring $g$ is soldered to the partition $c$ on each side and remains within the meter forming thus a permanent part of same. The construction and form of this ring $g$ are shown in Figs. 2, 3, and 5. The ring $g$ increases somewhat in width and forms an annular flange $g^2$ and at the end of same a short flange $g^1$ at right angles thereto. The annular flange $g^2$ is adapted to receive the flange $d^5$ of the novel diaphragm that rests then with its end on the flange $g^1$. A split ring $h$ is placed on the flange $d^5$ of the diaphragm and is tightened by the device $h^1$. A small wire ring $i$ is soldered to the securing ring $h$ and extends beyond same so that the leather portion $d^1$ of the diaphragm cannot come in contact with a sharp edge. To strengthen the ring $g$ a metal ring $g^3$ is soldered between the ring proper $g$ and the flange $g^1$. After the ring $g$ has been soldered to the partition $c$ the novel diaphragm is conveniently mounted by simply slipping it on the portion $g^2$ of the ring $g$ and fastening it by the securing ring $h$. The removal of the diaphragm is usually effected by loosening the tightening device $h^1$, removing the securing ring $h$ and taking off the diaphragm. The carriage $d^4$ as above stated is preferably detachable so that this part may remain in the meter. When the two diaphragms alternately shrink and expand by the pressure of the gas the registering mechanism is operated by means of the carriage $d^4$ and the rod $e$ in the usual manner.

The adhesive tape $f$ surrounding the angular flange $d^5$ of the diaphragm tends to keep the latter in shape and prevent it from expanding or shrinking during transportation. The tape may be taken off before inserting the diaphragm into the meter or it may be left on the angular flange $d^5$ when mounting same.

The slightly modified form of a detachable diaphragm shown in Fig. 4 comprises a plate $d^2$ stamped out to form two small lugs which are bent up at right angles to the plate which form the support for the movable pin of the carriage $d^4$.

I claim as my invention:

1. In a gas meter, a central partition, two rings one permanently secured to each side of said partition forming an annular flange and a short flange at right angles thereto in combination with a detachable diaphragm for each ring provided with an integral marginal flange adapted to be applied to the annular flange of the ring.

2. A detachable seamless diaphragm for gas meters consisting of a large circular leather disk having formed on its margin an annular flange, an adhesive tape on said annular flange, two metal disks on its central portion one on each side, and means to secure said metal disk to the diaphragm.

3. In a gas meter, a central partition having on each side thereof and soldered thereto a ring increasing gradually in diameter bent to form an annular flange and a short flange at right angles to the latter, and a strengthening ring between the ring proper and the annular flange.

4. A detachable seamless diaphragm for gas meters consisting of a circular leather disk with an integral marginal flange, two metal disks on its central portion one on each side riveted thereto, and a carriage on one metal disk in combination with a ring permanently secured in the meter bent to form an annular flange and a short flange at right angles to the latter, said annular flange being adapted to receive the marginal flange of the diaphragm, and detachable securing means on the flange of the diaphragm.

Signed at New York, N. Y., this 11th day of December, 1909.

HERMAN F. FRICK.

Witnesses:
LUDWIG K. BÖHM,
CORINNE MYERS.